United States Patent
Li et al.

(10) Patent No.: US 12,170,020 B2
(45) Date of Patent: Dec. 17, 2024

(54) TERMINAL DEVICE AND INFRARED LIGHT TRANSMISSION METHOD

(71) Applicant: HONOR DEVICE CO., LTD., Shenzhen (CN)

(72) Inventors: Chenlong Li, Shenzhen (CN); Xianzhao Jia, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/919,849

(22) PCT Filed: May 10, 2022

(86) PCT No.: PCT/CN2022/091988
§ 371 (c)(1),
(2) Date: Oct. 19, 2022

(87) PCT Pub. No.: WO2023/020030
PCT Pub. Date: Feb. 23, 2023

(65) Prior Publication Data
US 2024/0203243 A1   Jun. 20, 2024

(30) Foreign Application Priority Data

Aug. 17, 2021 (CN) .......................... 202110944347.1

(51) Int. Cl.
*G08C 23/04* (2006.01)
*G01S 7/481* (2006.01)
(Continued)

(52) U.S. Cl.
CPC ............ *G08C 23/04* (2013.01); *G01S 7/4813* (2013.01); *G01S 17/04* (2020.01); *G08C 17/02* (2013.01);
(Continued)

(58) Field of Classification Search
CPC ....... G08C 23/04; G08C 17/02; G01S 7/4813; G01S 17/04; H04M 1/0264;
(Continued)

(56) References Cited

U.S. PATENT DOCUMENTS 8,842,358 B2 * 9/2014 Bareman ............... G02F 1/1533
359/267
11,099,689 B2   8/2021 Noguchi et al.
(Continued)

FOREIGN PATENT DOCUMENTS

CN   108696653 A   10/2018
CN   109788096 A   5/2019
(Continued)

*Primary Examiner* — Adnan Aziz
(74) *Attorney, Agent, or Firm* — WOMBLE BOND DICKINSON (US) LLP

(57) ABSTRACT

A terminal device and an infrared light transmission method are provided. A proximity light emission component and an infrared remote control emission component of the terminal device are in a shared mode. The proximity light emission component and the infrared remote control emission component share a same infrared lamp, lampshade, and appearance hole. A function of infrared remote control or a function of proximity light detection may be performed as required through one appearance hole, which can simplify hardware design and help to reduce costs. In addition, an infrared top path parallel to a screen of the terminal device and an infrared forward path perpendicular to the screen of the terminal device may be constructed based on an internal structure of the lampshade, and infrared light is transmitted through the infrared top path and the infrared forward path.

16 Claims, 7 Drawing Sheets

(51) Int. Cl.
  *G01S 17/04* (2020.01)
  *G08C 17/02* (2006.01)
  *H04M 1/02* (2006.01)
  *H04M 1/72415* (2021.01)

(52) U.S. Cl.
  CPC ..... *H04M 1/0266* (2013.01); *H04M 1/72415* (2021.01); *H04M 2250/10* (2013.01)

(58) Field of Classification Search
  CPC .......... H04M 1/0266; H04M 1/72415; H04M 1/72454; H04M 2250/10
  See application file for complete search history.

(56) References Cited

U.S. PATENT DOCUMENTS

| | | | |
|---|---|---|---|
| 11,265,415 B2 | 3/2022 | Li et al. | |
| 2011/0235281 A1* | 9/2011 | Mittleman | H04M 1/737 361/728 |
| 2013/0048837 A1* | 2/2013 | Pope | G01J 1/0407 250/214.1 |
| 2020/0304617 A1* | 9/2020 | Zhang | G06F 3/042 |
| 2021/0173082 A1* | 6/2021 | Zhang | G01S 7/4814 |
| 2021/0278059 A1* | 9/2021 | Garrett | G06F 3/147 |
| 2021/0392216 A1 | 12/2021 | Huang | |
| 2022/0057888 A1* | 2/2022 | Li | G01J 1/0271 |

FOREIGN PATENT DOCUMENTS

| | | | | |
|---|---|---|---|---|
| CN | 110753140 A | * | 2/2020 | ............ G01J 1/4204 |
| CN | 112164213 A | | 1/2021 | |
| CN | 111345014 B | | 1/2022 | |
| IN | 108200238 A | | 6/2018 | |
| JP | 2013121175 A | | 6/2013 | |

\* cited by examiner

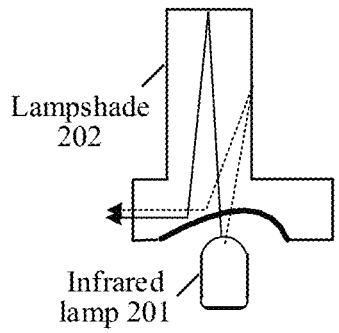

FIG. 10

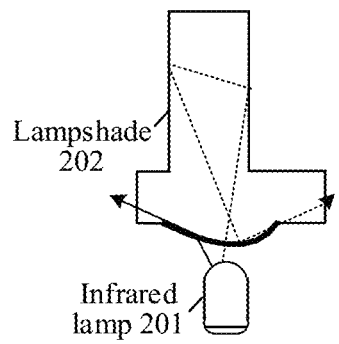

| An infrared controller controls an infrared lamp to emit infrared light, so that the infrared light transmits through a first infrared path and a second infrared path | ~ S1201 |

| Transmit, through an infrared emission hole to the outside of a terminal device, the infrared light transmitted along the first infrared path | ~ S1202 |

| Transmit, through the ink area to the outside of the terminal device, the infrared light transmitted along the second infrared path | ~ S1203 |

TERMINAL DEVICE AND INFRARED LIGHT TRANSMISSION METHOD

CROSS-REFERENCE TO RELATED APPLICATIONS

This application is a National Stage of International Application No. PCT/CN2022/091988, filed on May 10, 2022, which claims priority to Chinese Patent Application No. 202110944347.1, filed on Aug. 17, 2021, both of which are hereby incorporated by reference in their entireties.

TECHNICAL FIELD

This application relates to the field of terminals, and more specifically, to a terminal device and an infrared light transmission method.

BACKGROUND

A terminal device may detect whether there is an obstacle in the environment with a proximity sensor (proximity sensor, PS). For example, when answering or making a call, a terminal device may sense, with a proximity sensor, proximity light reflected back to the terminal device by a face, so as to determine a proximity state of the obstacle (the face) relative to the terminal device.

At present, a common solution is organic light-emitting diode (organic light-emitting diode, OLED) under-screen proximity light detection. This solution has an independent proximity light emission component. Proximity light is emitted upwards along a path on the top of the terminal device and is reflected by an obstacle to enter a proximity light receiving area.

However, this method has a complex architecture and requires additional costs in designing proximity light hardware. In addition, a proximity state of an obstacle may be incorrectly determined due to the directional defect of this method.

SUMMARY

This application provides a terminal device and an infrared light transmission method. The terminal device has a simple design, can reduce hardware costs, and helps to improve the success rate of proximity detection and infrared remote control.

According to a first aspect, a terminal device is provided, including: an infrared lamp, a lampshade, an infrared emission hole, an infrared controller, a cover glass, and a display screen. The infrared lamp is located below the cover glass, the lamp head of the infrared lamp is located below the lampshade, and the display screen is located below the cover glass.

Ink is deployed on a lower side of the cover glass and in a projection area of the skirt of the lampshade on the cover glass, to form an ink area. The infrared controller is connected to the infrared lamp and is configured to control the infrared lamp to emit infrared light, so that the infrared light is transmitted through a first infrared path and a second infrared path, and the infrared light is used for proximity light detection or infrared remote control. The first infrared path is an infrared path that starts from a lamp head area of the infrared lamp, passes along an inner cavity of the lampshade, and faces the top of the terminal device, and the second infrared path is an infrared path that starts from the lamp head area of the infrared lamp, passes along the skirt of the lampshade, and faces the display screen.

The infrared emission hole is located on the top of the terminal device, so that the infrared light transmitted along the first infrared path is transmitted to the outside of the terminal device through the infrared emission hole. The infrared light transmitted along the second infrared path is transmitted to the outside of the terminal device through the ink area.

In an embodiment of this application, the terminal device has an infrared emission hole, and infrared light emitted by the infrared emission hole is used for proximity light detection or infrared remote control. Therefore, the same appearance hole is shared for infrared remote control and proximity light detection, which can simplify hardware design to reduce costs. In addition, there are two infrared paths inside the terminal device. One infrared path is provided towards the top of the terminal device, and the other infrared path is provided towards the screen direction of the terminal device. Simultaneous transmission of infrared light by the two infrared paths helps to increase the success rate of proximity light detection or infrared remote control.

With reference to the first aspect, in some implementations of the first aspect, the terminal device further includes: a proximity light receiver, located under the display screen. The proximity light receiver is configured to receive infrared light, perform analog-to-digital conversion on the infrared light to obtain a proximity detection value, and detect whether there is an obstacle in the environment according to the proximity detection value, where the proximity detection value is used to represent a proximity state of the terminal device, and the proximity state includes being close and being far away.

In an embodiment of this application, the proximity light receiver is located under the display screen, and an emission area is located on a top sidewall of the terminal device, which helps to reduce natural crosstalk between transmission and reception of infrared light.

With reference to the first aspect, in some implementations of the first aspect, the first infrared path is parallel to a screen direction of the terminal device, and the second infrared path is perpendicular to the screen direction of the terminal device.

In an embodiment of this application, the two infrared paths of different directions (or angles) help to perform the function of proximity light detection or infrared remote control and improve detection reliability of all scenarios.

With reference to the first aspect, in some implementations of the first aspect, the infrared controller includes an infrared remote control emission circuit and a proximity light emission circuit, the infrared remote control emission circuit and the proximity light emission circuit are connected in parallel at a cathode of the infrared lamp, the infrared remote control emission circuit and the proximity light emission circuit are mutually exclusive, and the infrared light emitted by the infrared lamp is a first infrared carrier signal or a second infrared carrier signal. The infrared remote control emission circuit is configured to emit the first infrared carrier signal, and the first infrared carrier signal is used to perform infrared remote control. The proximity light emission circuit is configured to emit the second infrared carrier signal, and the second infrared carrier signal is used to perform proximity light detection.

In an embodiment of this application, when the function of infrared remote control needs to be performed, the infrared remote control emission circuit may transmit the first infrared carrier signal. The first infrared carrier signal is a carrier signal of an infrared signal, and may perform the function of infrared remote control. In this case, the proximity light emission circuit is disabled. When the function of proximity light detection needs to be performed, the proximity light emission circuit may transmit the second infrared carrier signal. The second infrared carrier signal is a carrier signal of proximity light, and may perform the function of proximity light detection. In this case, the infrared remote control emission circuit is disabled. In this way, infrared remote control and proximity light detection may be mutually exclusive in scenarios and coexist in functions.

With reference to the first aspect, in some implementations of the first aspect, when the infrared light transmitted through the first infrared path is blocked by an obstacle on the periphery of the terminal device, the infrared light transmitted through the second infrared path is enhanced, and when the infrared light transmitted through the second infrared path is blocked by an obstacle on the periphery of the terminal device, the infrared light transmitted through the first infrared path is enhanced.

In an embodiment of this application, an obstacle on the periphery of the terminal device may approach the terminal device at an inappropriate angle, so that the infrared light transmitted through the first infrared path is blocked, and proximity light detection or infrared remote control cannot be performed. However, a part of the blocked infrared light may be reflected by the obstacle, return to the inside of the terminal device through the lampshade, and then may be transmitted along the second infrared path, which enhances infrared energy of the second infrared path. That is, a part of infrared light lost by the first infrared path may be compensated by the second infrared path, which can improve reliability of proximity light detection or infrared remote control.

With reference to the first aspect, in some implementations of the first aspect, the lampshade has a refraction surface configured to adjust an emission angle of the infrared light emitted by the infrared lamp, so that infrared light of a first ratio is emitted perpendicular to the screen direction of the terminal device, and infrared light of a second ratio is emitted parallel to the screen direction of the terminal device.

In an embodiment of this application, since required directions (or angles) of infrared remote control and proximity light detection are different, to meet both functional requirements of infrared remote control and proximity light detection, the structure of the lampshade may be adjusted, so that the emission angle of infrared light emitted by the infrared lamp can be adjusted.

With reference to the first aspect, in some implementations of the first aspect, the terminal device further includes: a shell and a middle frame. The shell is located under the display screen, and the middle frame is located between the display screen and the shell. The lampshade is embedded in the shell and the middle frame.

With reference to the first aspect, in some implementations of the first aspect, a gap area exists between the middle frame and a sidewall of the display screen, and the second infrared path is located in the gap area. The gap area is provided so that infrared light is transmitted through the second infrared path.

In an embodiment of this application, due to the existence of the gap area and the large emission angle of the infrared lamp, there is infrared light leaking into the inner cavity of the lampshade. Therefore, the leaked infrared light may be transmitted through the second infrared path formed in the gap area.

With reference to the first aspect, in some implementations of the first aspect, the ink has an infrared transmittance of 940 nm.

In an embodiment of this application, printing ink with an infrared transmittance of 940 nm on the cover glass helps to transmit, to the outside of the terminal device through the cover glass, infrared light transmitted through the second infrared path, to perform proximity light detection or infrared remote control.

According to a second aspect, an infrared light transmission method is provided, applied to a terminal device including an infrared lamp, a lampshade, an infrared emission hole, an infrared controller, a cover glass, and a display screen. Ink is deployed on a lower side of the cover glass and in a projection area of the skirt of the lampshade on the cover glass, to form an ink area, the infrared controller is connected to the infrared lamp, and the infrared emission hole is located on the top of the terminal device. The method includes: controlling, by the infrared controller, the infrared lamp to emit infrared light, so that the infrared light is transmitted through a first infrared path and a second infrared path, where the infrared light is used for proximity light detection or infrared remote control, the first infrared path is an infrared path that starts from a lamp head area of the infrared lamp, passes along an inner cavity of the lampshade, and faces the top of the terminal device, and the second infrared path is an infrared path that starts from the lamp head area of the infrared lamp, passes along the skirt of the lampshade, and faces the display screen; transmitting, through the infrared emission hole to the outside of the terminal device, the infrared light transmitted along the first infrared path; and transmitting, through the ink area to the outside of the terminal device, the infrared light transmitted along the second infrared path.

With reference to the second aspect, in a possible implementation of the second aspect, the terminal device further includes a proximity light receiver, located under the display screen, and the method further includes: receiving, by the proximity light receiver, infrared light, performing analog-to-digital conversion on the infrared light to obtain a proximity detection value, and detecting whether there is an obstacle in the environment according to the proximity detection value, where the proximity detection value is used to represent a proximity state of the terminal device, and the proximity state includes being close and being far away.

With reference to the second aspect, in a possible implementation of the second aspect, the first infrared path is parallel to a screen direction of the terminal device, and the second infrared path is perpendicular to the screen direction of the terminal device.

With reference to the second aspect, in a possible implementation of the second aspect, the infrared controller includes an infrared remote control emission circuit and a proximity light emission circuit, the infrared remote control emission circuit and the proximity light emission circuit are connected in parallel at a cathode of the infrared lamp, the infrared remote control emission circuit and the proximity light emission circuit are mutually exclusive, the infrared light emitted by the infrared lamp is a first infrared carrier signal or a second infrared carrier signal, and the method further includes: emitting, by the infrared remote control emission circuit, the first infrared carrier signal, where the first infrared carrier signal is used to perform infrared remote control; or emitting, by the proximity light emission circuit, the second infrared carrier signal, where the second infrared carrier signal is used to perform proximity light detection.

With reference to the second aspect, in a possible implementation of the second aspect, when the infrared light transmitted through the first infrared path is blocked by an obstacle on the periphery of the terminal device, the infrared light transmitted through the second infrared path is enhanced, and when the infrared light transmitted through the second infrared path is blocked by an obstacle on the periphery of the terminal device, the infrared light transmitted through the first infrared path is enhanced.

With reference to the second aspect, in a possible implementation of the second aspect, the lampshade has a refraction surface. The controlling, by the infrared controller, the infrared lamp to emit infrared light, so that the infrared light is transmitted through a first infrared path and a second infrared path includes: adjusting, by the refraction surface of the lampshade, an emission angle of the infrared light emitted by the infrared lamp, so that infrared light of a first ratio is emitted perpendicular to the screen direction of the terminal device, and infrared light of a second ratio is emitted parallel to the screen direction of the terminal device.

With reference to the second aspect, in a possible implementation of the second aspect, the ink has an infrared transmittance of 940 nm.

In the infrared light transmission method provided in this application, infrared light may be transmitted through two infrared paths in different directions. After the infrared light transmitted through one path is blocked by the obstacle, the infrared light may continue to be transmitted through the other infrared path. This increases the emission angle of proximity light detection and infrared remote control, and helps to increase the success rate of proximity light detection and infrared remote control.

BRIEF DESCRIPTION OF DRAWINGS

FIG. 10 is a schematic diagram of an internal light path of a lampshade according to an embodiment of this application:

FIG. 11 is a schematic diagram of another internal light path of a lampshade according to an embodiment of this application: and FIG. 12 is a schematic flowchart of an infrared light transmission method according to an embodiment of this application.

DESCRIPTION OF EMBODIMENTS

The following describes the technical solutions in this application with reference to the accompanying drawings.

In the embodiments of this application, words such as "first" and "second" are used to distinguish same or similar items with a basically same function and role. For example, a first path and a second path are used to distinguish between different infrared paths, and are not intended to limit a sequence thereof. A person skilled in the art may understand that the words "first" and "second" do not limit a number and an execution sequence thereof, and the words "first" and "second" do not necessarily limit difference.

It should be noted that, in this application, the word "exemplary" or "for example" is used to represent giving an example, an illustration, or a description Any embodiment or design scheme described as an "exemplary" or "for example" in this application should not be explained as being more preferred or having more advantages than another embodiment or design scheme. Exactly, use of the word "exemplary" or "for example" is intended to present a related concept in a specific manner.

The embodiments of this application may be applied to scenarios in which a screen-to-body ratio is large and there is insufficient space on the screen to perform a proximity light function. In addition, the screen in this embodiment of this application has a transmittance. Exemplarily, a screen with a transmittance of more than 1% at a light wavelength of 940 nm may be defined as a screen with a transmittance.

With the rapid development of terminal devices, full screens have become the trend of terminal devices. Therefore, thin and perspective screens such as OLED displays are increasingly widely used, and the demand of placing a proximity light sensor directly under a screen to perform a function of proximity light detection also increases.

In an OLED under-screen proximity light solution, to reduce crosstalk between an emission area and a reception area, the emission area and the reception area may be spatially separated, so that infrared light used for infrared remote control is emitted through the top of a terminal device and infrared light used for proximity light detection is emitted through a gap of the terminal device, and infrared light reflected back is received by a proximity light receiver under the screen to detect a proximity state of an obstacle.

Figure 1:
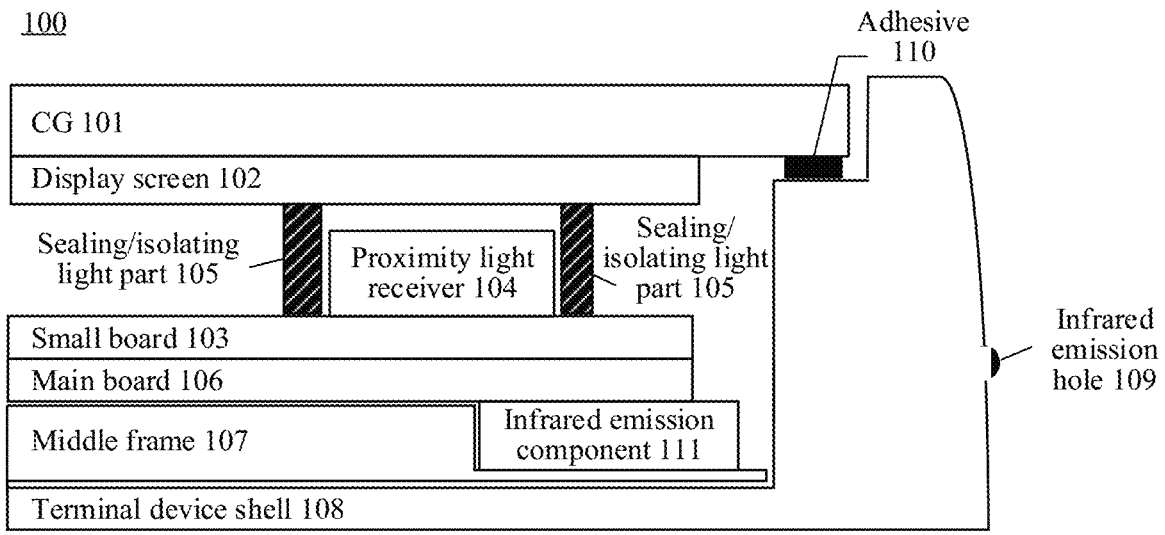
FIG. 1 is a schematic diagram of an internal structure of a terminal device based on an OLED under-screen proximity light solution.

FIG. 1 is a schematic diagram of an internal structure of a terminal device 100 based on an OLED under-screen proximity light solution. As shown in FIG. 1, the terminal device 100 includes a cover glass (cover glass, CG) 101, a display screen 102, a small board 103, a proximity light receiver 104, at least one sealing, an isolating light part 105, a main board 106, a middle frame 107, a terminal device shell 108, an infrared emission hole 109, an adhesive 110, and an infrared emission component 111.

The proximity light receiver 104 is located on the small board 103 and under the display screen 102, and the at least one sealing and the isolating light part 105 are configured to isolate ambient light that leaks from a screen gap of the terminal device 100, to prevent interference with the proximity light receiver 104. The small board 103 may be connected to the main board 106 through an elastic sheet, or the small board 103 may be welded on the main board 106. The infrared emission component 111 is connected to the main board 106. The adhesive 110 is configured to connect the CG 101 to the terminal device shell 108. The terminal device 100 may control the infrared emission component 111 to emit infrared light to the outside of the terminal device 100 through the infrared emission hole 109, to perform the function of infrared remote control.

There is a gap between the terminal device shell 108 and the screen of the terminal device. The infrared light emitted by the infrared emission component may be emitted to the outside of the terminal device through the gap and received by the proximity light receiver 104 under the screen, to perform the function of proximity light detection.

Exemplarily, the proximity light receiver 104 is configured to receive infrared light and convert the infrared light into a proximity detection value through an analog-to-digital converter (analog-to digital converter, ADC). The proximity detection value may be referred to as a P-β value. The P-β value may be used to indicate a proximity state. A smaller P-β value indicates that an obstacle (for example, a face) is far away from the screen of the terminal device, that is, indicates a "far away" state. A larger P-β value indicates that an obstacle is close to the screen of the terminal device, that is, indicates a "close" state. The terminal device may control the screen to turn on or off according to the P-β value.

It should be understood that the small board 103 and the main board 106 may not be connected through an elastic sheet 105, that is, the small board may be directly welded on the main board 106, which is not limited in the embodiments of this application.

It should be understood that the middle frame 107 and the terminal device shell 108 of the terminal device 100 may be combined together by plastic, that is, the terminal device shell 107 and the middle frame 112 may be integrated, which is not limited in the embodiments of this application.

The following analyzes problems in implementing the function of proximity light detection by the terminal device 100.

In terms of hardware design, due to the limited size of the terminal device 100 and numerous and complex internal components, if two appearance holes are provided on the top of the terminal device 100, where one appearance hole is configured to transmit infrared light for infrared remote control, and the other appearance hole is configured to transmit infrared light for proximity light detection, the aesthetics of the terminal device is affected, the difficulty of design is increased, and hardware costs are increased.

In terms of proximity light detection performance, the terminal device 100 has a directional defect. This is because the terminal device 100 only has a light exit path along the appearance hole on the top of the terminal device 100, and light is received by the proximity light receiver 104 placed under the display screen 102 (hereinafter referred to as under the screen for short). Therefore, when the light exit path on the top of the terminal device 100 is blocked, the proximity light receiver 104 under the screen cannot receive the proximity light normally. As a result, a distance between the obstacle and the terminal device 100 cannot be detected normally. This may lead to detection anomalies and the proximity state is detected as the far away state.

In view of the above problems in hardware design and performance of the terminal device, an embodiment of this application provides a terminal device. A proximity light emission component and an infrared remote control emission component of the terminal device are in a shared mode. That is, the proximity light emission component and the infrared remote control emission component may share a same infrared lamp, lampshade, and appearance hole. The function of infrared remote control and the function of proximity light detection may be performed as required through one appearance hole, which can simplify hardware design and help to reduce costs. In addition, a top path parallel to a screen of the terminal device and a forward path perpendicular to the screen of the terminal device may be constructed based on an internal structure of the lampshade, and infrared light is transmitted through the top path and the forward path. This helps to increase the success rate of proximity light detection or infrared remote control and improve the user experience.

In this embodiment of this application, infrared remote control and proximity light detection may share the same emission component and appearance hole basically because the requirement of the function of infrared remote control is at a specific time and does not exist continuously for a long time. In addition, since both infrared remote control and proximity light detection use an infrared band around 940 nm, there is natural coupling between infrared remote control and proximity light detection. If infrared remote control and proximity light detection work at the same time, crosstalk occurs. This is why infrared remote control and proximity light detection cannot coexist in scenarios. Hereinafter, emitted light waves for infrared remote control and proximity light detection are collectively referred to as infrared light, and an emission component shared for infrared remote control and proximity light detection is referred to as an infrared light emission component.

It should be understood that infrared remote control and proximity light detection of the terminal device in the embodiments of this application cannot coexist in scenarios, but can coexist in functions through a cathode control circuit topology.

Figure 2:
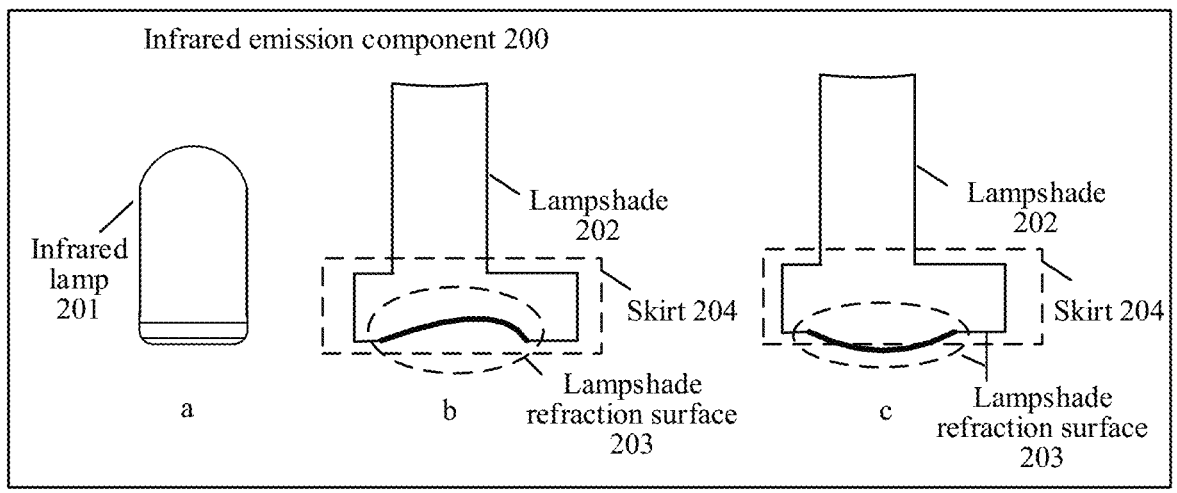
FIG. 2 is a schematic diagram of an infrared light emission component according to an embodiment of this application.

FIG. 2 is a schematic diagram of an infrared emission component 200 according to an embodiment of this application. As can be seen from FIG. 2, the infrared emission component 200 includes an infrared lamp 201 and a lampshade 202, and the lampshade 202 includes a lampshade refraction surface 203, a is a schematic diagram of a possible infrared lamp, and b and c are schematic diagrams of two possible lampshades. The lampshades shown in b and c have lampshade refraction surfaces in different shapes, and different refraction surfaces may bring different infrared light refraction effects.

Exemplarily, the infrared lamp is a light-emitting diode (light-emitting diode, LED) lamp.

It should be understood that the infrared lamp 201 and the lampshade 202 may also have other different shapes and structures. For example, a width and a height of the main body of the lampshade 202 may be adjusted, which is not limited in this embodiment of this application.

Exemplarily, the lampshade 202 is made of an injection molded material having an infrared transmittance of 940 nm. Since the lampshade 202 has a high transmittance, the actual effect of angle conversion is improved, and a signal-to-noise ratio (signal-to-noise ratio, SNR) of the entire proximity light detection system is also significantly increased.

It should be understood that the infrared transmittance of 940 nm means that the ink area has a transmittance of more than 40% for infrared light of 940 nm.

It should be understood that, in this embodiment of this application, the infrared emission component 111 in FIG. 1 may be shared for infrared remote control and proximity light detection, thereby realizing "one lamp for two purposes", that is, the infrared lamp 201 may perform both the function of infrared remote control and the function of proximity light detection.

In a scenario in which a user holds and uses a terminal device, a screen direction of the terminal device usually faces the face, and the user expects that the function of infrared remote control may be performed without adjusting an angle of the terminal device, that is, infrared remote control requires infrared light facing the top of the mobile phone, and proximity light detection usually requires infrared light facing the screen direction of the mobile phone or infrared light parallel to the screen direction of the mobile phone. Therefore, directions (or angles) required for infrared remote control and proximity detection are different.

To improve the success rate of proximity light detection and infrared remote control and take into account both the function of infrared remote control and the function of proximity light detection, the structure of the lampshade 202 may be adjusted to distribute infrared energy emitted by the infrared lamp 201.

Exemplarily, the lampshade refraction surface 203 may be designed in the middle of the skirt of the lampshade 202 to separate the infrared energy emitted by the infrared lamp 201, so that more infrared energy is directed towards (that is, perpendicular to) the direction screen of the mobile phone or parallel to the screen direction of the mobile phone, to meet the needs of proximity light detection. The rest of the skirt of the lampshade 202 is flat and has no slope, which can satisfy a conventional infrared remote control scenario. A part of the lampshade is designed for refraction and a part of the lampshade is designed to be flat to distribute infrared energy, so that application requirements of infrared remote control and proximity detection at different angles may be taken into account, and infrared remote control and proximity detection may coexist in functions.

Exemplarily, 70% of the infrared energy emitted by the infrared lamp 201 may be used to perform the function of proximity light detection, and the other 30% of the infrared energy may be used to perform the function of infrared remote control. This is because the infrared remote control scenario may be configured with a higher driving current than the proximity light detection scenario. The function of infrared remote control may be performed by increasing the driving current. However, an emission current of proximity light has a functional bottleneck and cannot be configured as a higher driving current. Therefore, the lampshade 202 is designed to distribute more infrared energy to perform the function of proximity light detection. It should be understood that there may also be other distribution ratios of infrared energy, which is not limited in this embodiment of this application.

It should be understood that a width of the refraction region of the lampshade refraction surface 203 may also be adjusted to achieve different ratios of infrared energy distribution, which is not limited in this embodiment of this application.

Shapes of the infrared lamp and the lampshade shown in FIG. 2 are only examples, and other shapes are also possible, which is not limited in this embodiment of this application.

In the following, the terminal device provided in this embodiment is described in detail with reference to FIG. 3 to FIG. 11 by using an example in which the infrared light emission component is located on the top of the terminal device and the proximity light receiver is located under the screen.

Figure 3:
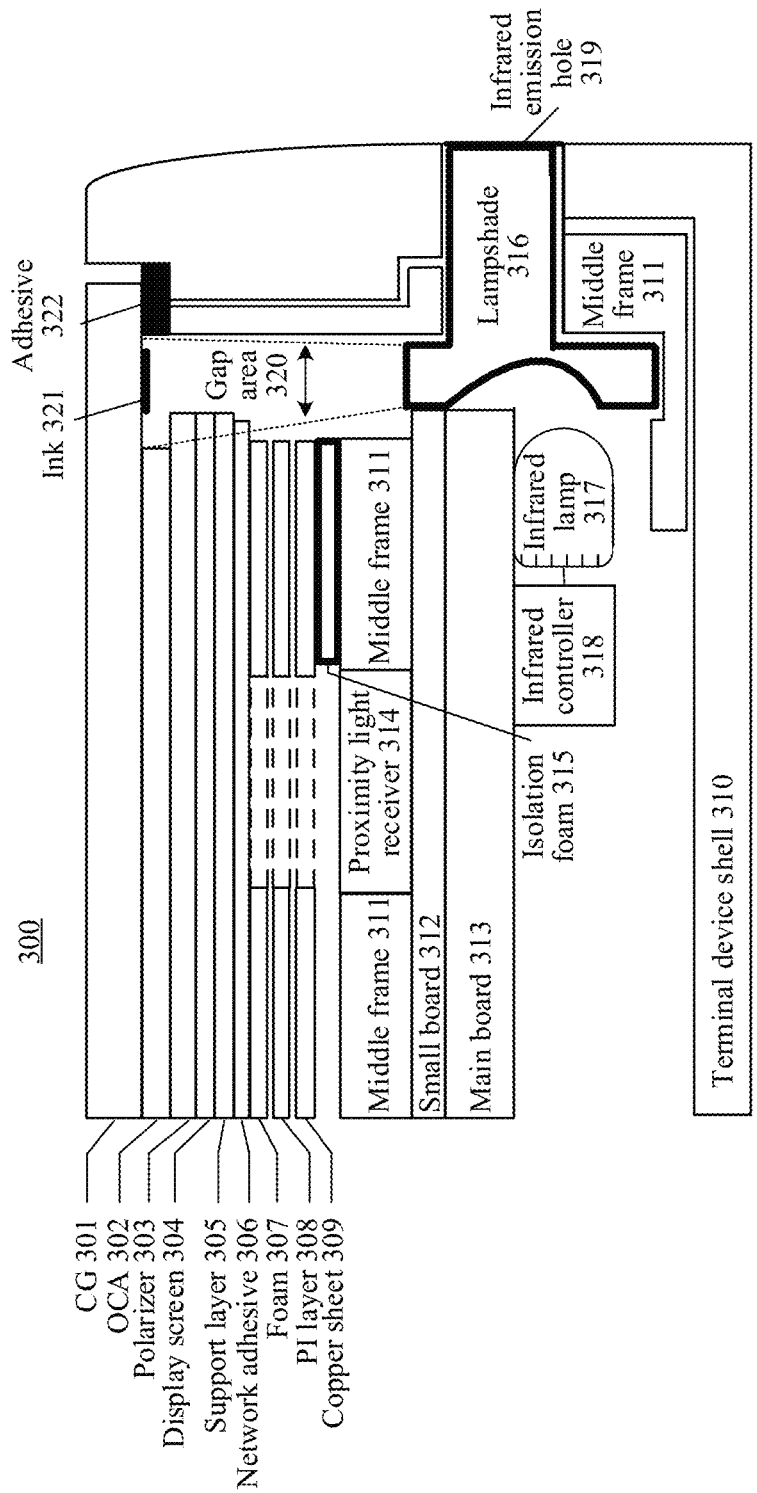
FIG. 3 is a schematic diagram of an internal structure of a terminal device according to an embodiment of this application.

FIG. 3 is a schematic diagram of an internal structure of a terminal device 300 according to an embodiment of this application. FIG. 3 is a cross-sectional view of the internal structure of the terminal device 300 in which a cover glass CG 301 is placed upwards horizontally. As shown in FIG. 3, the terminal device 300 may include: the CG 301, an optically clear adhesive (optically clear adhesive, OCA) 302, a polarizer 303, a display screen 304, a support layer (BF) 305, a network adhesive 306, a foam 307, a polyimide (polyimide, PI) layer 308, and a copper sheet 309, which form the screen of the terminal device 300. The terminal device 300 further includes: a terminal device shell 310, a middle frame 311, a small board 312, a main board 313, a proximity light receiver 314, an isolation foam 315, a lampshade 316, an infrared lamp 317, an infrared controller 318, an infrared emission hole 319, a gap area 320, ink 321, and an adhesive 322.

It should be understood that the infrared lamp 317 is similar to the infrared lamp 201 in FIG. 2, the lampshade 316 may also have the structure as shown in b in FIG. 2 or c in FIG. 2, and the structure of the lampshade as shown in b in FIG. 2 is described as an example below.

The cover glass CG 301 is located on the top of the terminal device 300 placed horizontally, and serves to protect the terminal device 300. The OCA 302 under the cover glass CG is a special adhesive for gluing a transparent optical element (for example, a lens), is colorless and transparent, has a light transmittance above 90% and good bonding strength, may be cured at a room temperature or a medium temperature, and has the feature of small curing shrinkage. The display screen 304 below the OCA 302 is used to display images. The support layer (BF) 305 has light transmittance.

The network adhesive 306, the support layer 305, the display screen 304, the polarizer 303, the OCA 302, and the CG 301 have light transmittance. There are openings on the foam 307, the PI layer 308, and the copper sheet 309, and the openings may form a light transmitting area (as shown by a dashed part of the foam 307, the PI layer 308, and the copper sheet 309 in the figure). The light transmitting area may allow infrared light to pass through, and the remaining part other than the light transmitting area has light shielding properties.

The proximity light sensor 314 is located under the screen and above the small board 312, and in the opening of the middle frame 311, and may receive, through the light transmitting area, infrared light returned from the outside of the terminal device 300.

The infrared controller 318 may control the infrared lamp 317 to emit infrared light, to perform the function of infrared remote control or the function of proximity light detection, and the infrared light may be emitted through the infrared emission hole 319 on the top of the terminal device. The function of the infrared controller 318 may be implemented by hardware, or by executing corresponding software by hardware, which is not limited in this embodiment of this application.

In the terminal device 300, the skirt of the lampshade 316 has a projection area on a plane of the CG 301, infrared ray (infrared ray, IR) ink 321 may be printed on this area to form an ink area, and the IR ink may provide an infrared light transmittance of 940 nm.

The isolation foam 315 serves to isolate infrared light crosstalk between emission and reception. Therefore, a position for placing the isolation foam 315 only needs to serve the purpose of isolating crosstalk. A specific position for placing the isolation foam 315 is not limited in this embodiment of this application.

In this embodiment of this application, there may be a part of leaked infrared light in the gap area 320, and this part of infrared light may cause crosstalk to the infrared light received by the proximity light receiver 104. Based on this, the isolation foam 315 may be placed obliquely between the emission area and the reception area, to reduce the impact of the leaked infrared light on the proximity light receiver 314 to improve the accuracy of a proximity light detection result.

Since the infrared emission components (that is, the infrared lamp 317 and the lampshade 316) are located on the top of the terminal device 300 and the proximity light receiver 314 is located under the display screen 304, proximity light emission and reception may be located on different small boards, to reduce crosstalk between emission and reception.

There is the gap area 320 between the lampshade 316 and the CG 301. Due to a large emission angle of an LED light source, in addition to the infrared light emitted towards the top of the terminal device, there may be a part of leaked infrared light in the gap area 320. Therefore, the leaked infrared light may be emitted through the ink area on the CG 301 and received by the proximity light receiver 314 under the screen, to perform the function of proximity light detection. Since the proximity light emission component is not under the screen, this helps to solve the problem of screen flare caused when the emission component is under the screen. A specific implementation process of proximity light detection is described below.

Exemplarily, an opening of the gap area 320 is within 0.7 mm, and a distance between the lampshade 316 and the CG 301 is about 1 mm.

It should be understood that the proximity light sensor in this embodiment of this application includes a proximity light emission component and a proximity light receiver. The proximity light emission component and the proximity light receiver may be disposed independently and are connected by hardware, which is not limited in this embodiment of this application.

Figure 4:
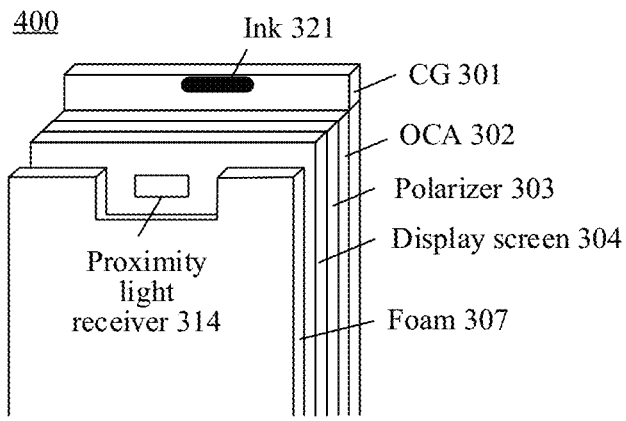
FIG. 4 is a schematic diagram of an internal structure of another terminal device according to an embodiment of this application.

FIG. 4 is a schematic diagram of an internal structure of another terminal device 400 according to an embodiment of this application. FIG. 4 is a schematic diagram of the internal structure of the terminal device 300 in which the CG 301 is placed vertically. As shown in FIG. 4, the terminal device 400 includes the CG 301, an OCA 302, a polarizer 303, a display screen 304, a foam 307, a proximity light receiver 314, and ink 321 in an order from back to front.

It should be understood that the schematic diagram of the internal structure of the terminal device 400 shown in FIG. 4 also includes: a support layer 305, a network adhesive 306, a PI layer 308, a copper sheet 309, a terminal device shell 310, and a middle frame 311, which are not shown in FIG. 4. Other structures are also similar to those of the terminal device 300, and are not repeated herein again.

As can be seen from FIG. 2 and FIG. 3, the ink area formed by the ink 321 on the CG 301 exactly faces the projection area of the skirt of the lampshade 316. Since the ink area has an infrared transmittance of 940 nm and allows infrared light to pass through, a part of leaked infrared light of the infrared lamp 317 may be emitted through the ink area and received by the proximity light receiver 314 under the screen. Compared with the proximity light solution in which only a top light transmitting area exists, in this embodiment of this application, a light transmitting area perpendicular to the screen direction is added. In this way, when the infrared light emitted from the top light transmitting area parallel to the screen direction cannot normally achieve proximity light detection or infrared remote control, the light transmitting area perpendicular to the screen direction may be used as compensation to achieve proximity light detection or infrared remote control, to help to increase the success rate of proximity light detection or infrared remote control. A specific light path compensation process is described with reference to the description of FIG. 8 and FIG. 9 below.

Figure 5:
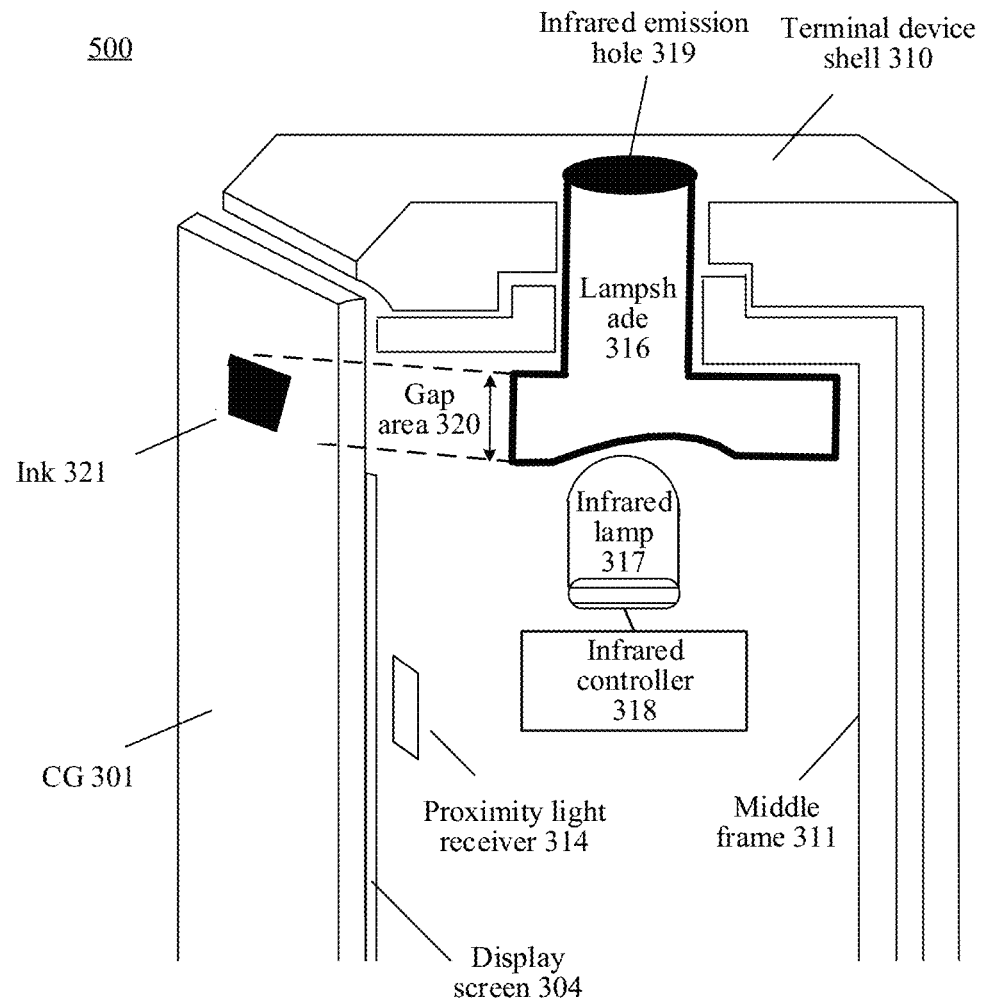
FIG. 5 is a schematic diagram of an internal structure of still another terminal device according to an embodiment of this application.

FIG. 5 is a schematic diagram of an internal structure of still another terminal device 500 according to an embodiment of this application. FIG. 5 is a schematic diagram of an internal structure of the terminal device 300 in which the CG 301 is placed vertically. As shown in FIG. 5, the terminal device 500 includes: a CG 301, a display screen 304, a terminal device shell 310, a middle frame 311, a proximity light receiver 314, a lampshade 316, an infrared lamp 317, an infrared controller 318, an infrared emission hole 319, a gap area 320, and ink 321.

It should be understood that the schematic diagram of the internal structure of the terminal device 500 shown in FIG. 5 also includes: an OCA 302, a polarizer 303, a support layer 305, a network adhesive 306, foam 307, a PI layer 308, a copper sheet 309, and isolation foam 315, which are not shown in FIG. 5.

Figure 6:
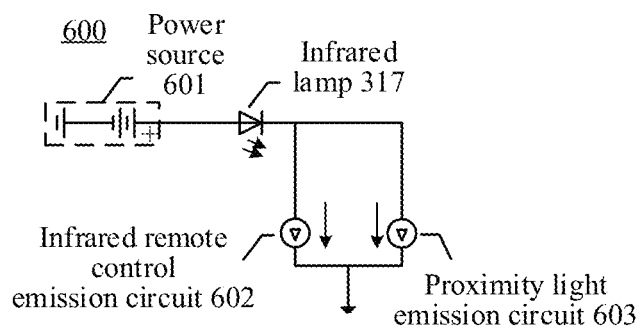
FIG. 6 is a topology diagram of an infrared lamp cathode control circuit according to an embodiment of this application.
Figure 7:
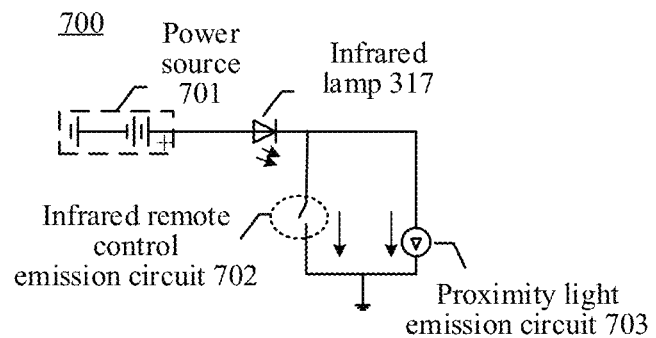
FIG. 7 is a topology diagram of another infrared lamp cathode control circuit according to an embodiment of this application.

When the infrared controller 318 implements the coexistence of the function of infrared remote control and the function of proximity light detection by a hardware circuit, a circuit form of the infrared controller 318 may be shown in FIG. 6 or FIG. 7.

FIG. 6 is a topology diagram of an infrared lamp cathode control circuit 600 according to an embodiment of this application. The circuit 600 includes a power source 601, an infrared lamp 317, an infrared remote control emission circuit 602, and a proximity light emission circuit 603. The infrared remote control emission circuit 602 and the proximity light emission circuit 603 are connected in parallel at a cathode of the infrared lamp 317, to control the cathode of the infrared lamp 317.

Exemplarily, the infrared remote control emission circuit 602 and the proximity light emission circuit 603 may be circuits capable of supporting carrier emission, and the circuits may be equivalent to controlled current source generators, so that current consistency is better. Correspondingly, the infrared remote control emission circuit 602 may send a pulse-coded waveform to the infrared lamp 317 in a form of a pulsating current source, to control the infrared lamp 317 to turn on and off periodically. The proximity light emission circuit 603 may send encoded energy to the infrared lamp 317 to control the infrared lamp 317 to perform the function of proximity light detection.

For example, the infrared remote control emission circuit 602 and the proximity light emission circuit 603 are controlled current source generators (hereinafter referred to as current sources). Since the two current sources are connected in parallel at the cathode of the infrared lamp 317, in a non-working state, a current source model is in a low-resistance state, and there is almost no scenario in which the function of infrared remote control and the function of proximity light detection coexist, that is, A does not work and B works, B does not work and A works, or neither works. Therefore, this can support a working mode in which infrared remote control and proximity light detection are mutually exclusive.

Exemplarily, in an infrared remote control working scenario, the proximity light emission circuit 603 may be disabled, so that the proximity light emission circuit 602 cannot control the infrared lamp 317, and the infrared remote control emission circuit 602 controls the infrared lamp 317 to emit a carrier signal of an infrared signal, to perform the function of infrared remote control.

Exemplarily, in a proximity light detection scenario, the infrared remote control emission circuit 602 may be disabled, so that the infrared remote control emission circuit 602 cannot control the infrared lamp 317, and the proximity light emission circuit 603 controls the infrared lamp 317 to emit a carrier signal of proximity light, to detect a proximity state.

FIG. 7 is a topology diagram of another infrared lamp cathode control circuit 700 according to an embodiment of this application. The circuit 700 includes a power source 701, an infrared lamp 317, an infrared remote control emission circuit 702, and a proximity light emission circuit 703. The infrared remote control emission circuit 702 and the proximity light emission circuit 703 are connected in parallel at a cathode of the infrared lamp 317, to control the cathode of the infrared lamp 317.

Exemplarily, the infrared remote control emission circuit 702 may be a pulsating switch, and control the flow of the infrared lamp 317 in a form of a pulsating switch, that is, the emitting part of the proximity light sensor may directly control the cathode of the infrared lamp 317, and is connected in parallel to the infrared remote control circuit. Exemplarily, the magnitude of the infrared light emission current may be 200 mA.

It should be understood that a difference between the circuit 600 and the circuit 700 lies in different forms of infrared remote control circuits. The infrared remote control emission circuit 602 of the circuit 600 is a controlled pulsating current source, and the infrared remote control emission circuit 702 of the circuit 700 is a pulsating switch. In addition, the proximity light emission circuit 703 of the circuit 700 may also be a pulsating switch, which is not limited in this embodiment of this application.

With reference to FIG. 3 to FIG. 7, the foregoing describes the terminal device in which infrared remote control and proximity light detection share a same emission component. In the terminal device, the gap area 320 is provided between the lampshade 316 and the CG 301. The gap area 320 may have a part of infrared light that leaks from the infrared lamp 317 along the edge of the lampshade 316. In actual scenarios of infrared remote control and proximity light detection, an emission angle may be expanded by using this part of infrared light.

Figure 8:
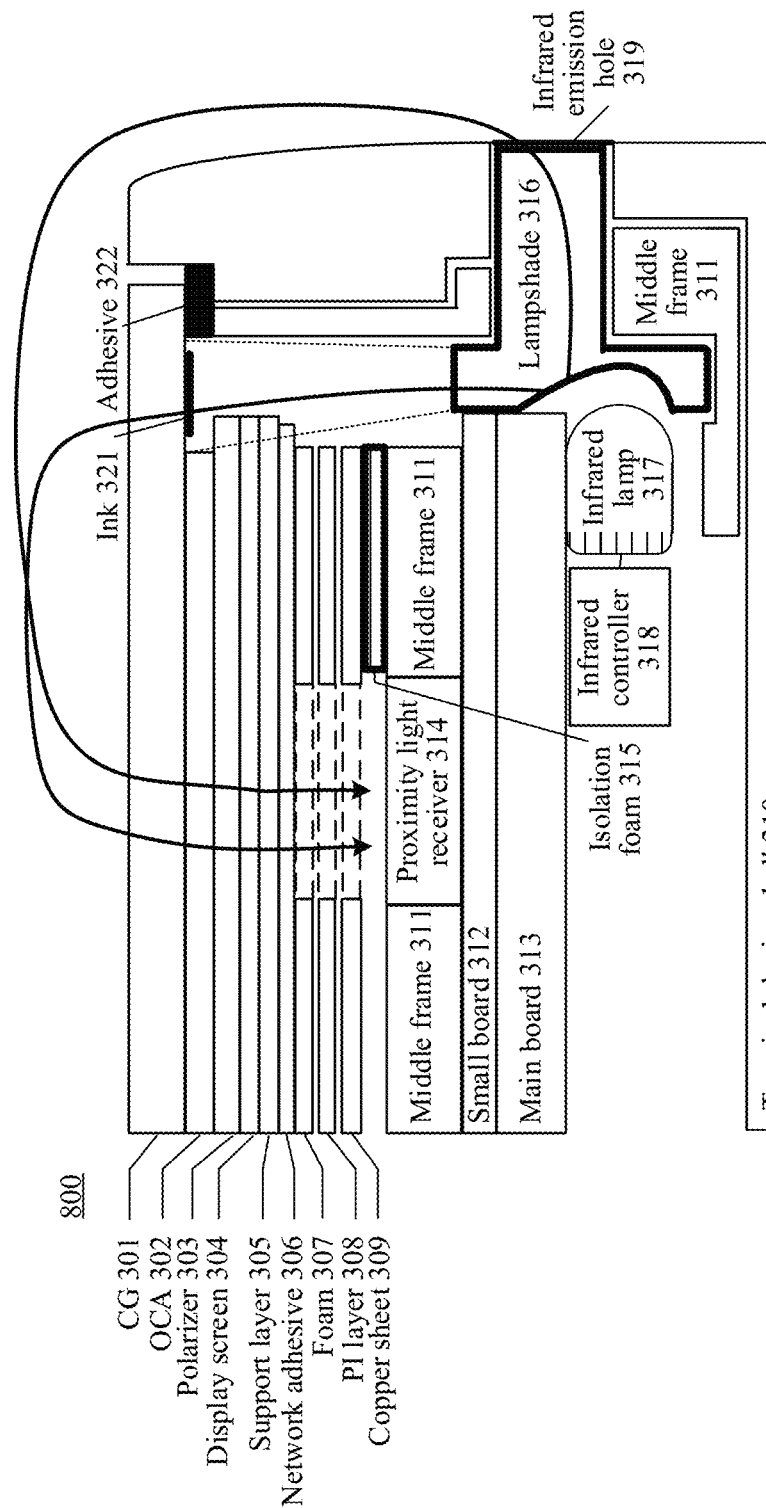
FIG. 8 is a schematic diagram of an internal structure of yet another terminal device according to an embodiment of this application.

FIG. 8 is a schematic diagram of an internal structure of yet another terminal device 800 according to an embodiment of this application. Compared with the terminal device 300, the terminal device 800 shows an infrared light path inside the terminal device when the function of proximity light detection is actually triggered. As can be seen from FIG. 8, the infrared light emitted by the infrared lamp 317 has a first infrared path (hereinafter referred to as an infrared top path) facing the top of the terminal device 800. In addition, the gap area 320 (not shown in FIG. 9) also has a second infrared path (hereinafter referred to as an infrared forward path) facing the screen direction of the terminal device 800.

Optionally, the edge of the screen of the terminal device 800 has a light transmitting area, and the light transmitting area may also be used to transmit infrared light to the outside of the terminal device 800, to implement proximity light detection or infrared remote control.

It should be understood that the infrared top path is an infrared path that starts from the lamp head area of the infrared lamp 317, passes along the inner cavity of the lampshade 316, and faces the top of the terminal device 800, and the infrared top path is parallel to the screen direction of the terminal device 800. The infrared forward path is an infrared path that starts from the lamp head area of the infrared lamp 317, passes along the skirt of the lampshade 316, and faces the display screen 304, and the infrared forward path is perpendicular to the screen direction of the terminal device 800. The infrared light emitted at two different angles may be received by the proximity light receiver 314 under the screen, so as to detect a proximity state.

In an ideal scenario, the infrared light emitted by the two infrared paths may be normally received by the proximity light receiver 314 under the screen. However, when there is an obstacle around the terminal device 800 and consequently the proximity light receiver 314 cannot normally receive the proximity light, the proximity state may be incorrectly recognized.

Figure 9:
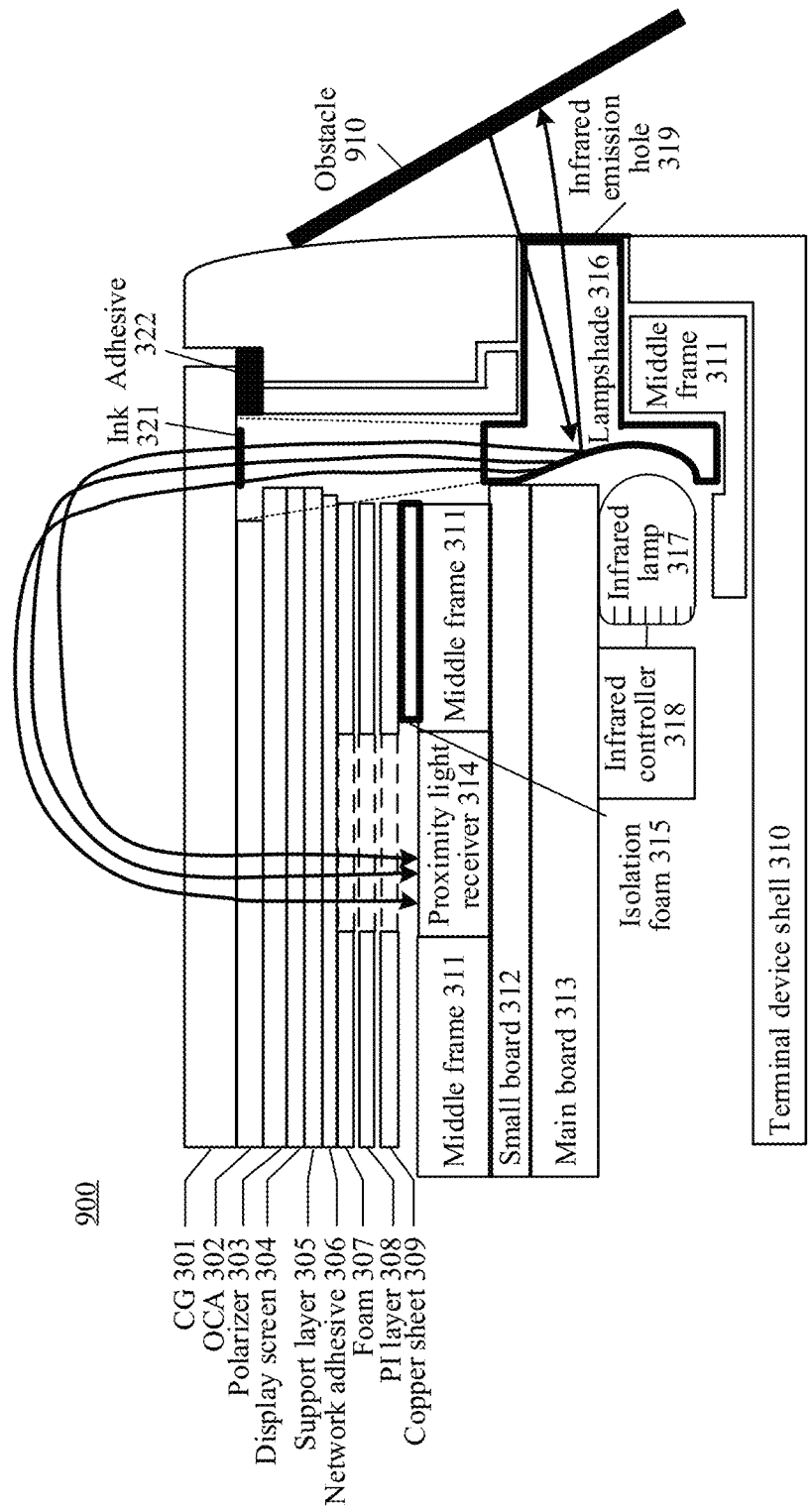
FIG. 9 is a schematic diagram of an internal structure of yet another terminal device according to an embodiment of this application.

FIG. 9 is a schematic diagram of an internal structure of yet another terminal device 900 according to an embodiment of this application. Compared with the terminal device 800, the terminal device 900 has an additional obstacle 910. As can be seen from FIG. 9, when there is an obstacle 910 on the top of the terminal device 900 as shown in the figure, the infrared light emitted by the infrared lamp 317 is emitted through the infrared top path, and is blocked by the obstacle 910 and cannot be received by the proximity light receiver 314 under the screen, thereby interrupting the loopback from emission to reception.

However, in a scenario of proximity light detection, since the gap area 320 of the terminal device 900 also has an infrared forward path, the infrared light emitted by the infrared lamp 317 may also be emitted from the infrared forward path along the edge of the lampshade 316, and is received by the proximity light receiver 314 under the screen. In addition, although the infrared light emitted through the infrared top path is blocked by the obstacle 910 and the function of proximity light detection cannot be performed, this part of infrared light blocked by the obstacle 910 is reflected back by the lampshade 316, and the infrared light that is reflected back may be emitted from the infrared forward path along the edge of the lampshade 316. This can enhance infrared energy of the infrared forward path, and is equivalent to compensating for energy loss of the infrared top path through the infrared forward path. The proximity light receiver 314 under the screen may also obtain the infrared energy required for proximity light detection. This helps to increase the success rate of proximity light detection.

It should be understood that after the infrared light passing through the infrared forward path is blocked by an obstacle, the infrared energy of the infrared top path can be similarly enhanced, which is not repeated herein.

When there is no obstacle around the terminal device 800 as shown in FIG. 8, because the infrared light emitted by the infrared lamp 317 has crosstalk inside the lampshade 316, a part of infrared light leaks to the proximity light receiver 314 through the gap area 320. This is unavoidable and this part of infrared energy is defined as A.

In a possible scenario, when the user uses the terminal device 900 to answer or make a call, to prevent the face from accidentally touching the screen when the user answers or makes the call, the terminal device 900 usually may detect a proximity state of the face with the function of proximity light detection, and control, according to the detected proximity state, whether the screen is in an on or off state. For example, if detecting that a face is in a "close" state, the terminal device 900 may control the screen to be in an off state to prevent the face from accidentally touching the screen and affecting the call.

However, in a scenario in which the terminal device uses the function of proximity light detection, due to a problem in a posture of holding the terminal device 900 by the user, the head may block the infrared light emitted through the infrared top path, that is, the obstacle 910 is the head of the user. In a scenario in which the infrared light emitted by the infrared lamp 317 is blocked by the obstacle 910, a part of infrared light is reflected back to the lampshade 316 by the obstacle 910, and the infrared light that leaks to the proximity light receiver 314 through the gap area 320 also increases. This part of infrared energy is defined as B. It may be detected, based on a result value of B-A, whether there is an obstacle on the top of the terminal device. This may compensate for incorrect detection of the proximity state caused by blocking of the obstacle 910 as shown in FIG. 9, and help to improve correctness of proximity light detection, so that the function may be performed and the detection reliability of all scenarios is ensured.

Optionally, infrared energy may be transmitted and compensated through the gap area 320 by increasing infrared light emission intensity, so that infrared energy for proximity light detection may also be obtained, thereby improving the success rate of proximity light detection.

In a scenario in which a user uses infrared remote control, the terminal device provided by this embodiment of this application may also expand the sensing angle of infrared remote control. Generally, when a user implements the function of infrared remote control on a handheld terminal device, an infrared emission hole of the terminal device needs to exactly face a receiving device, such as a TV set or an air conditioner, which limits the angle of infrared remote control. However, since the terminal device provided by this embodiment of this application has an infrared forward path perpendicular to the screen direction, when the screen of the terminal device obliquely faces the receiving device, the infrared light emitted through the infrared forward path may be used to perform the function of infrared remote control. In this way, when the screen obliquely faces the receiving device, there is also a remote control function, and the user does not need to place the infrared emission hole on the top of the terminal device to exactly face the receiving device, which helps to improve infrared remote control experience of the user.

In some scenarios, the infrared light emitted through the infrared top path may be blocked by an obstacle and cannot perform the function of infrared remote control. In this case, infrared light may be emitted through the infrared forward channel to perform the function of infrared remote control. Correspondingly, the infrared light emitted through the infrared forward path is blocked by an obstacle and cannot perform the function of infrared remote control, and the terminal device may also emit infrared light through the infrared top channel, to perform the function of infrared remote control.

It should be understood that, unlike the scenario of proximity light detection in which the infrared light is received by the proximity light receiver, the infrared light passing through the two paths in the scenario of infrared remote control is received by a receiving device (for example, an air conditioner or a TV set) outside the terminal device.

Optionally, in a scenario in which a function of infrared remote control learning is added, infrared remote control learning may be performed through the infrared forward path, which expands angles of infrared remote control learning.

FIG. 10 is a schematic diagram of an internal light path of a lampshade according to an embodiment of this application. In FIG. 10, the structure of the lampshade 202 shown in b in FIG. 2 is used as an example for description. After the infrared lamp 201 emits infrared light, the infrared light is refracted by the lampshade refraction surface (not shown in FIG. 10, refer to the lampshade refraction surface 203 shown in b in FIG. 2) and may form refracted light as shown by a solid line and a dashed line in FIG. 10, and the refracted light may finally be emitted through the skirt of the lampshade (not shown in FIG. 10, refer to the skirt 204 shown in b in FIG. 2). Exemplarily, based on the lampshade structure shown in FIG. 10, 70% of the infrared energy emitted by the infrared lamp 201 may be used to perform the function of proximity light detection, and the other 30% of the infrared energy may be used to perform the function of infrared remote control. That is, 70% of the infrared light may be transmitted through the infrared forward path, and 30% of the infrared light may be transmitted through the infrared top path.

FIG. 11 is a schematic diagram of another internal light path of a lampshade according to an embodiment of this application. In FIG. 11, the structure of the lampshade 202 shown in c in FIG. 2 is used as an example for description. After the infrared lamp 201 emits infrared light, the infrared light is refracted by the lampshade refraction surface (not shown in FIG. 10, refer to the lampshade refraction surface 203 shown in c in FIG. 2) and may form refracted light as shown by a solid line and a dashed line in FIG. 11, and the refracted light may finally be emitted through the skirt of the lampshade (not shown in FIG. 10, refer to the skirt 204 shown in c in FIG. 2). Exemplarily, based on the lampshade structure shown in FIG. 10, 60% of the infrared energy emitted by the infrared lamp 201 may be used to perform the function of proximity light detection, and the other 40% of the infrared energy may be used to perform the function of infrared remote control. That is, 60% of the infrared light may be transmitted through the infrared forward path, and 40% of the infrared light may be transmitted through the infrared top path.

It should be understood that the above infrared light distribution ratio is only an example, different lampshade structures may form different internal light paths, and refraction angles of infrared light are also different and infrared light distribution ratios are also different. The lampshade structure designed in this embodiment of this application aims to refract a part of infrared light through the lampshade refraction surface and emit the infrared light from the ink area on the screen through the skirt of the lampshade, so as to perform the function of proximity light detection or the function of infrared remote control through the infrared forward path and the infrared top path, that is, infrared light is transmitted on both infrared paths, which helps to improve the success rate of proximity light detection and infrared remote control.

An embodiment of this application further provides an infrared light transmission method. Infrared light may be transmitted through two infrared paths in different directions. After the infrared light transmitted through one path is blocked by the obstacle, the infrared light may continue to be transmitted through the other infrared path. This increases the emission angle of proximity light detection and infrared remote control, and helps to increase the success rate of proximity light detection and infrared remote control.

The infrared light transmission method is applied to a terminal device including an infrared lamp, a lampshade, an infrared emission hole, an infrared controller, a cover glass, and a display screen, where ink is deployed on a lower side of the cover glass and in a projection area of the skirt of the lampshade on the cover glass, to form an ink area, the infrared controller is connected to the infrared lamp, and the infrared emission hole is located on the top of the terminal device.

FIG. 12 is a schematic flowchart of an infrared light transmission method 1200 according to an embodiment of this application. The method 1200 includes the following steps:

S1201: The infrared controller controls the infrared lamp to emit infrared light, so that the infrared light is transmitted through a first infrared path and a second infrared path, where the infrared light is used for proximity light detection or infrared remote control, the first infrared path is an infrared path that starts from a lamp head area of the infrared lamp, passes along an inner cavity of the lampshade, and faces the top of the terminal device, and the second infrared path is an infrared path that starts from the lamp head area of the infrared lamp, passes along the skirt of the lampshade, and faces the display screen.

S1202: Transmit, through the infrared emission hole to the outside of the terminal device, the infrared light transmitted along the first infrared path.

S1203: Transmit, through the ink area to the outside of the terminal device, the infrared light transmitted along the second infrared path.

Optionally, the terminal device further includes a proximity light receiver, located under the display screen, and the method 1200 further includes: receiving, by the proximity light receiver, infrared light, performing analog-to-digital conversion on the infrared light to obtain a proximity detection value, and detecting whether there is an obstacle in the environment according to the proximity detection value, where the proximity detection value is used to represent a proximity state of the terminal device, and the proximity state includes being close and being far away.

Optionally, the first infrared path is parallel to a screen direction of the terminal device, and the second infrared path is perpendicular to the screen direction of the terminal device.

Optionally, the infrared controller includes an infrared remote control emission circuit and a proximity light emission circuit, the infrared remote control emission circuit and the proximity light emission circuit are connected in parallel at a cathode of the infrared lamp, the infrared remote control emission circuit and the proximity light emission circuit are mutually exclusive, the infrared light emitted by the infrared lamp is a first infrared carrier signal or a second infrared carrier signal, and the method 1200 further includes: emitting, by the infrared remote control emission circuit, the first infrared carrier signal, where the first infrared carrier signal is used to perform infrared remote control: or emitting, by the proximity light emission circuit, the second infrared carrier signal, where the second infrared carrier signal is used to perform proximity light detection.

Optionally, when the infrared light transmitted through the first infrared path is blocked by an obstacle on the periphery of the terminal device, the infrared light transmitted through the second infrared path is enhanced, and when the infrared light transmitted through the second infrared path is blocked by an obstacle on the periphery of the terminal device, the infrared light transmitted through the first infrared path is enhanced.

Optionally, the lampshade has a refraction surface. S1201 of controlling, by the infrared controller, the infrared lamp to emit infrared light includes: adjusting, by the refraction surface of the lampshade, an emission angle of the infrared light emitted by the infrared lamp, so that infrared light of a first ratio is emitted perpendicular to the screen direction of the terminal device, and infrared light of a second ratio is emitted parallel to the screen direction of the terminal device.

Optionally, the ink has an infrared transmittance of 940 nm.

In the embodiments of this application, the terminal device may be a handheld device or an in-vehicle device having a wireless connection function, and the terminal device may also be referred to as a terminal (terminal), a user equipments (user equipment, UE), a mobile station (mobile station, MS), or a mobile terminal (mobile terminal, MT). At present, examples of some terminals are as follows: a mobile phone (mobile phone), a tablet computer, a smart television, a notebook computer, a pad (pad), a palmtop computer, a mobile Internet device (mobile Internet device. MID), a virtual reality (virtual reality, VR) device, an augmented reality (augmented reality. AR) device, a wireless terminal in industrial control (industrial control), a wireless terminal in self driving (self driving), a wireless terminal in remote medical surgery (remote medical surgery), a wireless terminal in smart grid (smart grid), a wireless terminal in transportation safety (transportation safety), a wireless terminal in smart city (smart city), a wireless terminal in smart home (smart home), a cellular phone, a cordless phone, a session initiation protocol (session initiation protocol, SIP) phone, a wireless local loop (wireless local loop, WLL) station, a personal digital assistant (personal digital assistant. PDA), a handheld device having a wireless communication function, a computing device, another processing device connected to a wireless modem, an in-vehicle device, a wearable device, a terminal device in a future 5G network, a terminal device in a future evolved public land mobile network (public land mobile network. PLMN), and the like. A specific technology applied to the terminal device and a specific device form thereof are not limited in the embodiments of this application.

As an example rather than a limitation, in the embodiments of this application, the terminal device may also be a wearable device. A wearable device may also be referred to as a wearable intelligent device, and is a general term of wearable devices, such as glasses, gloves, watches, clothes, and shoes, that are developed by applying wearable technologies in intelligent designs of daily wear. A wearable device is a portable device that can be directly worn on a body or integrated into clothes or an accessory of a user. A wearable device is not only a hardware device, but also used to implement a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application and need to work with other devices such as smartphones, such as various smart bracelets or smart jewelry for monitoring physical signs.

In addition, in the embodiments of this application, the terminal device may also be a terminal device in an Internet of things (Internet of things, IoT) system. IoT is an important part in future development of information technologies, and is mainly technically characterized in that things are connected to networks through communication technologies, so as to achieve intelligent networks of human-machine interconnection and interconnection between things.

The terminal device in the embodiments of this application may alternatively be referred to as user equipment (user equipment, UE), a mobile station (mobile station, MS), a mobile terminal (mobile terminal, MT), an access terminal, a user unit, a user station, a mobile site, a mobile station, a remote station, a remote terminal, a mobile device, a user terminal, a terminal, a wireless communication device, a user agent, or a user apparatus.

In the embodiments of this application, the terminal device or each network device includes a hardware layer, an operating system layer running on the hardware layer, and an application layer running on the operating system layer. The hardware layer includes hardware such as a central processing unit (central processing unit, CPU), a memory management unit (memory management unit, MMU), and a memory (which is also referred to as a main memory). The operating system may be any one or more computer operating systems for implementing service processing through a process (process), for example, a Linux operating system, a Unix operating system, an Android operating system, an iOS operating system, or a Windows operating system. The application layer includes applications such as a browser, an address book, word processing software, and instant messaging software.

In the description of this application, it should be understood that orientation or position relationships indicated by the terms such as "upper", "lower", "front", "rear", "left", "right", "top", "bottom", "inside", and "outside" are based on orientation or position relationships shown in the accompanying drawings, and are used only for ease and brevity of illustration and description, rather than indicating or implying that the mentioned apparatus or component needs to have a particular orientation or needs to be constructed and operated in a particular orientation. Therefore, such terms should not be construed as limiting of this application.

In the embodiments of this application, unless otherwise explicitly specified or defined, the terms such as "mount", "install", "connect", "connection", and "fixed" should be understood in a broad sense. For example, the connection may be a fixed connection, a detachable connection, or an integral connection: or the connection may be a mechanical connection or an electrical connection: or the connection may be a direct connection, an indirect connection through an intermediary, or internal communication between two components or mutual interaction relationship between two components. A person of ordinary skill in the art may understand specific meanings of the foregoing terms in this application according to a specific situation.

In the specification of the embodiments of this application, claims, and accompanying drawings, the terms "first", "second", and "third" are intended to distinguish between similar objects, but do not necessarily indicate a specific order or sequence. It should be understood that, data used in this way is interchangeable in a suitable case, so that the embodiments of this application described herein can be implemented, for example, in a sequence other than the sequences depicted or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

A person of ordinary skill in the art may notice that the exemplary units and algorithm steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of this application.

The foregoing embodiments are merely provided for describing the technical solutions of the embodiments of this application, but not intended to limit this application. A person of ordinary skill in the art shall understand that although the embodiments of this application have been described in detail with reference to the foregoing embodiments, modifications can still be made to the technical solutions described in the foregoing embodiments, or equivalent replacements can be made to some or all technical features in the technical solutions, provided that such modifications or replacements do not cause the essence of corresponding technical solutions to depart from the scope of the technical solutions of the embodiments of this application.

What is claimed is:

1. A terminal device, comprising:
an infrared lamp, a lampshade, an infrared emission hole, an infrared controller, a cover glass, and a display screen; wherein
the infrared lamp is located below the cover glass, a lamp head of the infrared lamp is located below the lampshade, and the display screen is located below the cover glass;
ink is deployed on a lower side of the cover glass and in a projection area of a skirt of the lampshade on the cover glass, to form an ink area;
the infrared controller is connected to the infrared lamp and is configured to control the infrared lamp to emit infrared light which is transmitted through a first infrared path and a second infrared path, wherein the infrared light is used for proximity light detection or infrared remote control, the first infrared path is an infrared path that starts from a lamp head area of the infrared lamp, passes along an inner cavity of the lampshade, and faces a first surface of the terminal device, and the second infrared path is an infrared path that starts from the lamp head area of the infrared lamp, passes along the skirt of the lampshade, and faces the display screen;
the infrared emission hole is located on the first surface of the terminal device, so that the infrared light transmitted along the first infrared path is transmitted to the outside of the terminal device through the infrared emission hole; and
the infrared light transmitted along the second infrared path is transmitted to the outside of the terminal device through the ink area.

2. The terminal device according to claim 1, further comprising:
a proximity light receiver, located under the display screen; wherein
the proximity light receiver is configured to receive the infrared light, perform analog-to-digital conversion on the infrared light to obtain a proximity detection value, and detect whether there is an obstacle in an environment of the terminal device according to the proximity detection value, wherein the proximity detection value is used to represent a proximity state of the terminal device, and the proximity state comprises being close and being far away.

3. The terminal device according to claim 1, wherein the first infrared path is parallel to a screen direction of the terminal device, and the second infrared path is perpendicular to the screen direction of the terminal device.

4. The terminal device according to claim 1, wherein the infrared controller comprises an infrared remote control emission circuit and a proximity light emission circuit, the infrared remote control emission circuit and the proximity light emission circuit are connected in parallel at a cathode of the infrared lamp, the infrared remote control emission circuit and the proximity light emission circuit are mutually exclusive, and the infrared light emitted by the infrared lamp is a first infrared carrier signal or a second infrared carrier signal;
the infrared remote control emission circuit is configured to emit the first infrared carrier signal, and the first infrared carrier signal is used to perform the infrared remote control; and
the proximity light emission circuit is configured to emit the second infrared carrier signal, and the second infrared carrier signal is used to perform the proximity light detection.

5. The terminal device according to claim 1, wherein when the infrared light transmitted through the first infrared path is blocked by an obstacle on a periphery of the terminal device, the infrared light transmitted through the second infrared path is enhanced, and when the infrared light transmitted through the second infrared path is blocked by a second obstacle on the periphery of the terminal device, the infrared light transmitted through the first infrared path is enhanced.

6. The terminal device according to claim 1, wherein the lampshade has a refraction surface configured to adjust an emission angle of the infrared light emitted by the infrared lamp, so that the infrared light of a first ratio is emitted perpendicular to a screen direction of the terminal device, and the infrared light of a second ratio is emitted parallel to the screen direction of the terminal device.

7. The terminal device according to claim 1, further comprising:
a shell and a middle frame; wherein
the shell is located under the display screen, and the middle frame is located between the display screen and the shell; and
the lampshade is embedded in the shell and the middle frame.

8. The terminal device according to claim 7, wherein a gap area exists between the middle frame and a sidewall of the display screen, and the second infrared path is located in the gap area; and
the gap area is provided so that the infrared light is transmitted through the second infrared path.

9. The terminal device according to claim 1, wherein the ink has an infrared transmittance of 940 nm.

10. An infrared light transmission method, applied to a terminal device comprising an infrared lamp, a lampshade, an infrared emission hole, an infrared controller, a cover glass, and a display screen, wherein ink is deployed on a lower side of the cover glass and in a projection area of a skirt of the lampshade on the cover glass, to form an ink area, the infrared controller is connected to the infrared lamp, the infrared emission hole is located on a first surface of the terminal device, and the method comprises:
controlling, by the infrared controller, the infrared lamp to emit infrared light, so that the infrared light is transmitted through a first infrared path and a second infrared path, wherein the infrared light is used for proximity light detection or infrared remote control, the first infrared path is an infrared path that starts from a lamp head area of the infrared lamp, passes along an inner cavity of the lampshade, and faces the first surface of the terminal device, and the second infrared path is an infrared path that starts from the lamp head area of the infrared lamp, passes along the skirt of the lampshade, and faces the display screen;
transmitting, through the infrared emission hole to the outside of the terminal device, the infrared light transmitted along the first infrared path; and
transmitting, through the ink area to the outside of the terminal device, the infrared light transmitted along the second infrared path.

11. The method according to claim 10, wherein the terminal device further comprises a proximity light receiver located under the display screen, and the method further comprises:
receiving, by the proximity light receiver, the infrared light, performing analog-to-digital conversion on the infrared light to obtain a proximity detection value, and detecting whether there is an obstacle in an environment of the terminal device according to the proximity detection value, wherein the proximity detection value is used to represent a proximity state of the terminal device, and the proximity state comprises being close and being far away.

12. The method according to claim 10, wherein the first infrared path is parallel to a screen direction of the terminal device, and the second infrared path is perpendicular to the screen direction of the terminal device.

13. The method according to claim 10, wherein the infrared controller comprises an infrared remote control emission circuit and a proximity light emission circuit, the infrared remote control emission circuit and the proximity light emission circuit are connected in parallel at a cathode of the infrared lamp, the infrared remote control emission circuit and the proximity light emission circuit are mutually exclusive, the infrared light emitted by the infrared lamp is a first infrared carrier signal or a second infrared carrier signal, and the method further comprises:
emitting, by the infrared remote control emission circuit, the first infrared carrier signal, wherein the first infrared carrier signal is used to perform the infrared remote control; or
emitting, by the proximity light emission circuit, the second infrared carrier signal, wherein the second infrared carrier signal is used to perform the proximity light detection.

14. The method according to claim 10, wherein when the infrared light transmitted through the first infrared path is blocked by an obstacle on a periphery of the terminal device, the infrared light transmitted through the second infrared path is enhanced, and when the infrared light transmitted through the second infrared path is blocked by a second obstacle on the periphery of the terminal device, the infrared light transmitted through the first infrared path is enhanced.

15. The method according to claim 10, wherein the lampshade has a refraction surface; and
the controlling, by the infrared controller, the infrared lamp to emit the infrared light, so that the infrared light is transmitted through the first infrared path and the second infrared path comprises:

adjusting, by the refraction surface of the lampshade, an emission angle of the infrared light emitted by the infrared lamp, so that the infrared light of a first ratio is emitted perpendicular to a screen direction of the terminal device, and the infrared light of a second ratio is emitted parallel to the screen direction of the terminal device.

16. The method according to claim 10, wherein the ink has an infrared transmittance of 940 nm.

* * * * *